(12) United States Patent
O'Mahony et al.

(10) Patent No.: US 9,791,538 B2
(45) Date of Patent: Oct. 17, 2017

(54) OCEAN-DEPLOYED SUBSURFACE SENSOR LOCATION POSITIONING SYSTEM

(71) Applicant: INTEL CORPORATION, Santa Clara, CA (US)

(72) Inventors: Barry A. O'Mahony, Banks, OR (US); Marc A. Alexander, Clackamas, OR (US)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 14/670,792

(22) Filed: Mar. 27, 2015

(65) Prior Publication Data

US 2016/0282442 A1   Sep. 29, 2016

(51) Int. Cl.
| | |
|---|---|
| G01S 3/80 | (2006.01) |
| G01S 5/00 | (2006.01) |
| G01S 5/14 | (2006.01) |
| G01S 5/30 | (2006.01) |
| G01V 1/38 | (2006.01) |
| G01S 5/02 | (2010.01) |
| G01V 1/18 | (2006.01) |

(52) U.S. Cl.
CPC .......... *G01S 5/0036* (2013.01); *G01S 5/0263* (2013.01); *G01S 5/14* (2013.01); *G01S 5/30* (2013.01); *G01V 1/3835* (2013.01); *G01S 5/0226* (2013.01); *G01V 1/186* (2013.01); *G01V 2210/1423* (2013.01); *G01V 2210/1425* (2013.01)

(58) Field of Classification Search
CPC . G01S 5/0036; G01S 5/14; G01S 5/30; G01S 5/0226; G01S 5/0263; G01V 1/186; G01V 1/3835; G01V 2210/1423; G01V 2210/1425
See application file for complete search history.

(56) References Cited

U.S. PATENT DOCUMENTS

| | | | |
|---|---|---|---|
| 2011/0141853 A1* | 6/2011 | Megdal | G01S 5/0045 367/117 |
| 2016/0282442 A1* | 9/2016 | O'Mahony | G01S 5/0036 |

\* cited by examiner

*Primary Examiner* — Daniel Pihulic
(74) *Attorney, Agent, or Firm* — Alpine Technology Law Group LLC

(57) ABSTRACT

The disclosure generally relates to a method, apparatus and system to deploy aquatic sensors to obtain oceanographic data. In an exemplary embodiment, a free-floating or untethered sensor receives signals from different transmitters. The signals may be configured to travel through air and/or water. The sensor records each signals' time of arrival and determines its location in relationship to known transmitters based on the signal travel time. The position of each sensor may be determined by triangulation to several devices whose positions are known. The distances from the sensor in question to each device is measured by means of time-of-flight measurements for a wireless signal from the sensor to each known-position device. Other methods such as trilateration or dead-reckoning may also be used. The sensor may additionally collect and record oceanographic or other environmental data.

22 Claims, 7 Drawing Sheets

OCEAN-DEPLOYED SUBSURFACE SENSOR LOCATION POSITIONING SYSTEM

BACKGROUND

Field

The disclosure generally relates to a method, apparatus and system to deploy aquatic sensors to obtain oceanographic data.

Description of Related Art

Outdoor navigation has been widely deployed due to the development of various systems including: global-navigation-satellite-systems (GNSS), Global Positioning System (GPS), Global Navigation Satellite System (GLONASS) and GALILEO. Such navigation techniques are only useful when satellite connection is readily available. GPS, GNSS and GLONASS are not suitable for geolocation when the receiver submerged in water.

Conventional underwater location systems include Navimate™ GPS for divers and GIB Positioning devices for robotics (manufactured by ACSA ALCEN™ of France). Such system generally use acoustic transmission but are not suited for large scale, inexpensive, deployment. Some of the conventional underwater location systems relay on a floating buoys to provide a radio link to a positioning satellite.

Applications for wireless sensor networks with location information already exist and has been implemented, for example, in agricultural applications. Conventional sensor-based applications include above-ground or above-surface antennas that rely on satellite positioning systems (i.e., GNSS, GPS, GLONASS) or other RF-based positioning systems for location determination. The ultra-high frequency (UHF) radio signals employed by these systems do not penetrate beneath the surface of the ocean.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

The disclosed embodiments generally address the problem of determining position of a large number of surface-floating or subsurface data collection sensors. The disclosed embodiments are readily and efficiently scalable. The surface-floating or subsurface data collection sensors may be self-contained and may be unattended for extended periods of time.

In an exemplary embodiment, the disclosure relates to location-determining system for a large cohort of subsurface, ocean-deployed sensors. Conventional subsurface sensors are may be untethered and free-floating at a depth which can be roughly determined by internal buoyancy control. Even though the subsurface sensors are untethered, their location in the 3D space of the ocean still needs to be known in order to make use of any collected data. For example, subsurface sensors may be used to collect reflections of acoustic waves from the ocean surface or below the surface. Among others, such data may be used for seismic imaging, oceanographic surveying and energy exploration. Other applications of free-floating subsurface sensor cohorts may include environmental monitoring, fishery and wildlife surveying.

The data collected by the subsurface sensor cohorts may be used to solve the so-called inverse problem to compute the profile of the various rock and sediment layers below the sea/ocean floor. The inverse problem determines the floor of the ocean (or other features of interest) as a function of acoustic waves reflected back from the ocean bottom. To this end, location of each sensor (along with the time of reception of each reflection) must be known.

Figure 1:
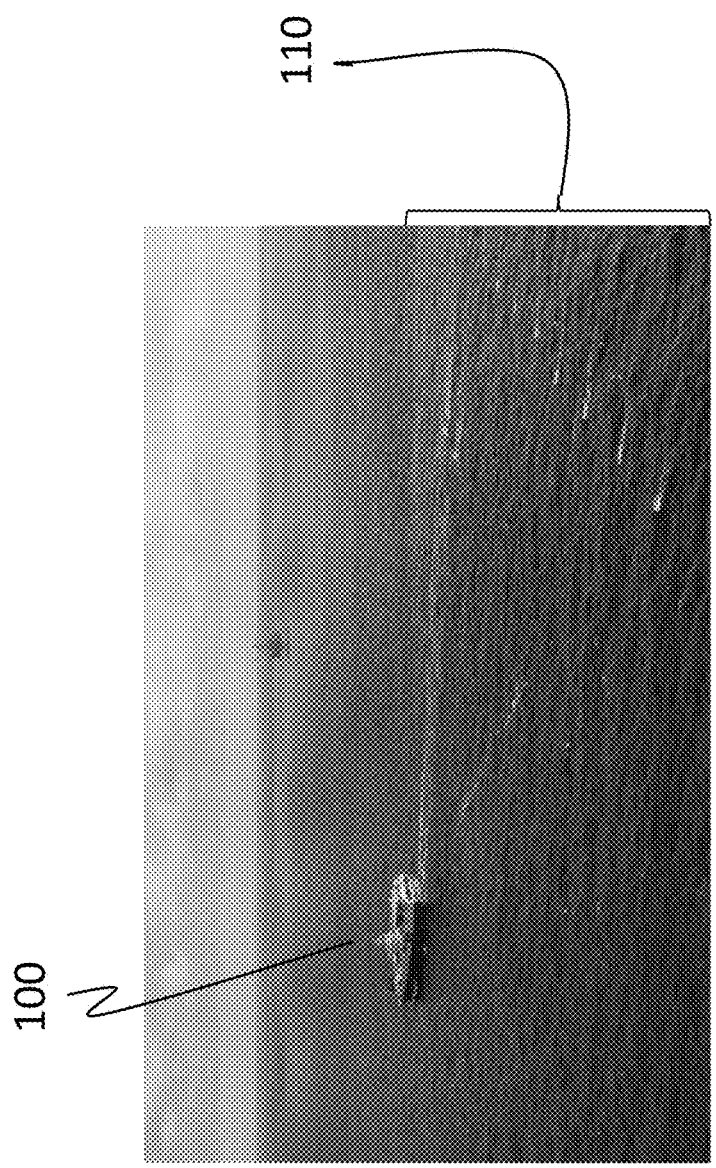
FIG. 1 shows a conventional subsurface sensor cohorts being dragged by a ship.

FIG. 1 shows a conventional subsurface sensor cohorts being dragged by a ship. Specifically, FIG. 1 shows ship 100 connected to several sensors 110 through a respective number of tow-lines. In conventional applications, such as FIG. 1, location of subsurface sensors are known because the subsurface sensors are tethered to an object whose location is known (i.e., ship 100). The components shown in FIG. 1 enable variety of tasks including subsurface surveying. During subsurface surveying, ship 100 may operate an acoustic cannon to generate signals aimed at the surface of the ocean. The signals are reflected by various layers at or below the ocean floor and are captured by sensors 110. The signal's time of travel along with the location of sensors 110 enable surveying the floor of the ocean and beneath it. In the conventional surveying example, the sensor locations are know because they are tethered at a fixed distance behind ship 100. However, deployment of such tethered networks are expensive with daily expenses exceeding $750,000.

An embodiment of the disclosure overcomes this and other deficiencies of the conventional techniques by providing untethered, wireless sensors that may be deployed and left floating for extended periods of time. The sensors, for example, may be left afloat for up to 100 days at a time. In an exemplary implementation, the sensor may be collected after a duration of data collection. The collected data may be downloaded from each sensor for analysis. An exemplary sensor may include surface sensors, subsurface sensors or a combination of both. Because it is important to know each sensor's location during the measurement period, an embodiment of the disclosure relates to a method and apparatus for location determination as a function of signals received by the sensor.

Accordingly, the disclosed embodiments address the problem of determining the position of a large number subsurface data collection sensors with an energy-efficient mechanism. The disclosed embodiments are scalable because each sensor may act as a self-sufficient data collection node. Thus, additional nodes may be added without deleterious effects. In one implementation, the data collection sensors may be left afloat for an extended period of time (e.g., more than a hundred days) without disturbing their operation.

Figure 2:
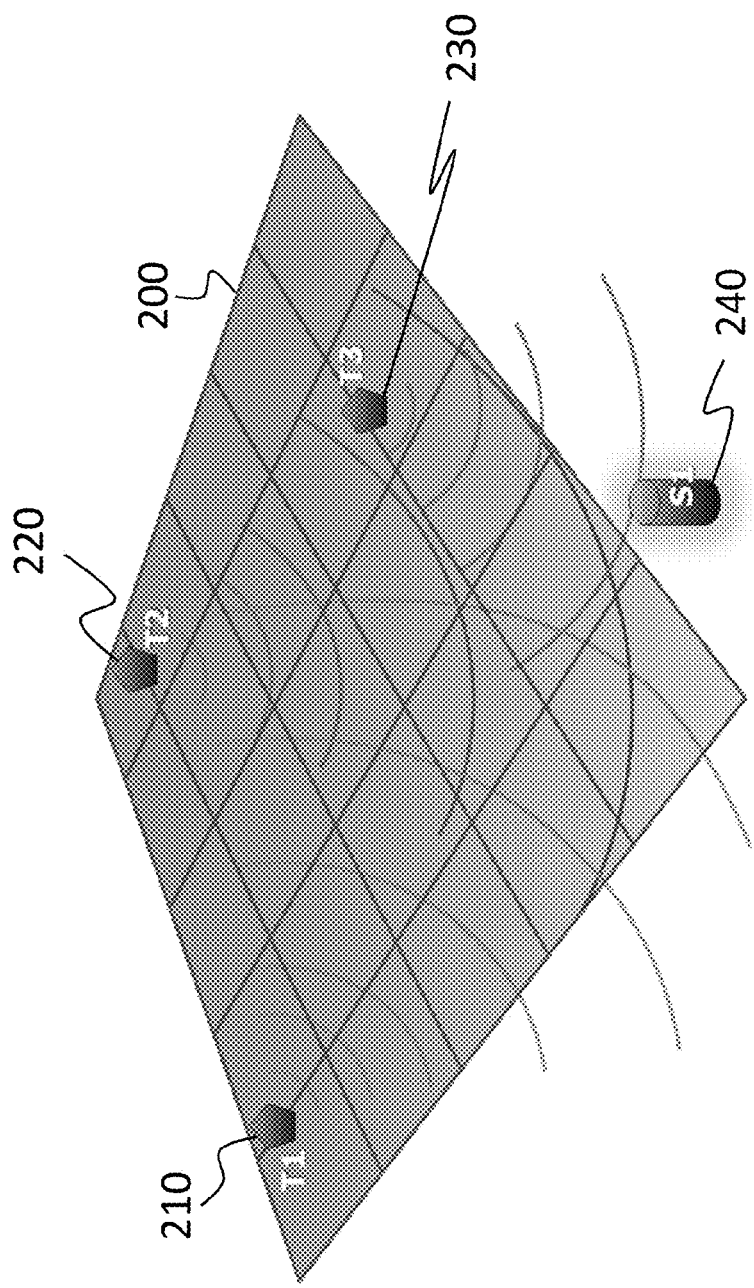
FIG. 2 schematically illustrates a system according to one embodiment of the disclosure.

FIG. 2 schematically illustrates a system according to one embodiment of the disclosure. In the system of FIG. 2, water surface is represented as grid 200 in which each of first transmitter (T1) 210, second transmitter (T2) 220 and third transmitter (T3) 230 are afloat. Each transmitter is configured to communicate with sensor (S1) 240. Each transmitter may communicate with one or more sensors independently of the other transmitters or transmit in concert with each other. Each of transmitters 210, 220 and 230, as well as sensor 240 may include an internal clock. The terminal clocks (not shown) and the sensor clock (not shown) may be synchronized to each other or to a common clock. In an exemplary embodiment, the clocks may be synchronized to the atomic clock.

In an implementation of the disclosure, the position of each of the transmitters 210, 220 and 230 is known. The transmitters' position may be determined in a variety of ways. For example, the transmitter may be close enough to the surface and may be equipped with above-surface antennas for receiving GPS or GNSS signals. As another example, the transmitter may be below surface 200 and be tethered to a surface device such that its location is known or easily determined in relation to the surface device. In still another example, the transmitter may be anchored to the ocean bottom and its position may be known.

While the disclosure may be directed to using multiple sensors, for illustration purposes only one subsurface sensor (S1) 240 is shown. Sensor 240 may be a free floating sensor device. The sensor may be above or below surface 200. In certain embodiments, sensor 200 receives signals from the transmitter devices and records their time of arrival. Each signal may associated with a unique transmitter. In one exemplary embodiment, the signal may include information that identifies the originating transmitter. In another exemplary embodiment, each of transmitters 210, 220 and 230 may transmit at a designated frequency. Thus, sensor 240 can readily associate the signal with the originating transmitter.

The signal transmission data may be collected and stored at sensor 240. Upon retrieval of the sensor, the data can be downloaded. Given that the signal transmission time from the originating transmitter and its receipt time at the sensor will be known, distance between the sensor and each of the originating transmitter may be readily determined. In certain embodiments of the disclosure, conventional triangulation may be used to determine the sensor location with respect to the known transmitters.

Figure 3:
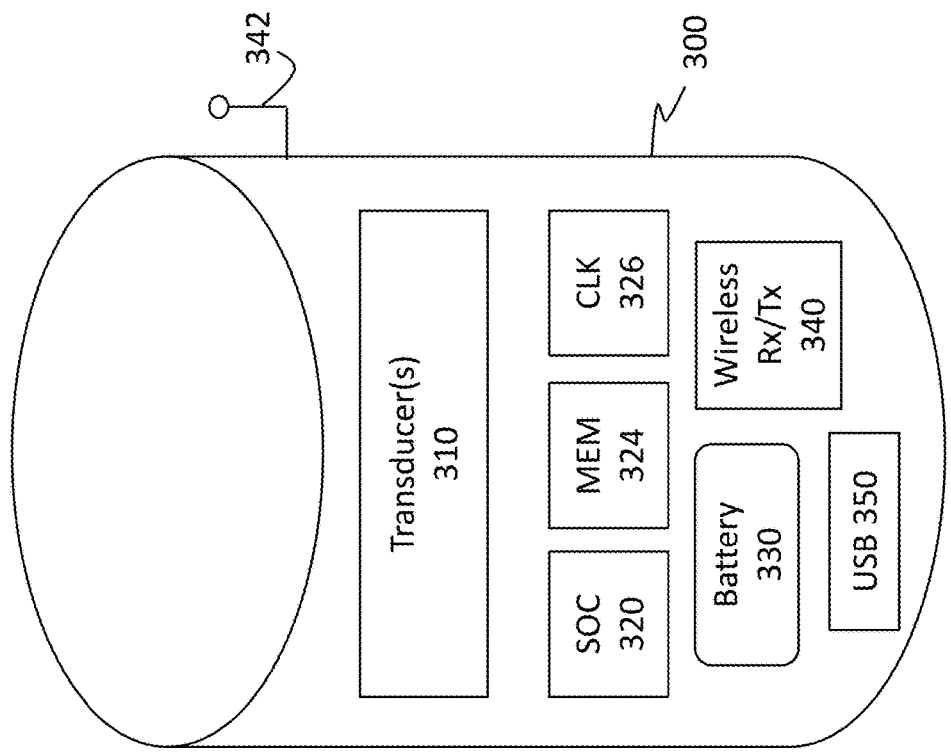
FIG. 3 illustrates an exemplary sensor according to one embodiment of the disclosure.

FIG. 3 illustrates an exemplary sensor according to one embodiment of the disclosure. Sensor 300 of FIG. 3 may be floating above or below the water surface. Sensor 300 includes one or more transducers 310, system on chip (SOC) 320, memory 324, clock 326, wireless receiver (and optionally, transmitter) 340, battery 330 and universal service bus (USB) 350. While not specifically shown in FIG. 3, the components of sensor 300 may communicate with each other. Transducers 310 may comprise one or more required sensors for the desired task(s). For example, the transducers may include a vector acoustic hydrophone for detecting the magnitude and direction of the seismic imaging reflections. Such transducers may be used to identify seismic movements or they may be used to survey the bottom of the ocean.

Wireless receiver 340 may be configured to receive underwater signals as well as air signals. While not shown, sensor 300 may include one or more antenna 342. Each antenna may be configured to receive (and optionally transmit) one or more signal types. In an exemplary embodiment, wireless receiver 340 may optionally include a wireless transmitter. Wireless transmitter 340 may also include the front-end circuitry to sample and convert incoming signal to digital data stream for storage in memory 324. Wireless receiver 340 may also include additional processing circuitry in communication with clock 340 to tag an incoming signal with a timestamp indicating the signal's receipt time. In certain embodiments, wireless receiver 340 may also discern the originating transmitter from data included in the signal itself. For example, wireless receiver 340 may determine identity of the originating transmitter from information embedded in the signal. In another exemplary embodiment, a unique frequency may be used by each transmitter to thereby identify the originating transmitter. In certain embodiments, wireless receiver 340 identifies the originating transmitter for the received signal as well as the signal's receipt time and directs the information to memory 324 for storage. As will be discussed in greater detail, this information may be used to determine location of sensor 300 at various times.

SOC 320 may comprise one or more processing circuits configured to implement desired operations. For example, SOC 320 may comprise circuitry and software to process various seismic readings based on information provided by transducers 310 and communicate the information to memory 324 for storage. The information may be retrieved from memory 324 at a later time for analysis.

Clock 326 may communicate with components of sensor 300. In one embodiment, clock 326 may be synchronized with an atomic clock. For example, clock 326 may utilize antenna 326 to periodically synchronize with an atomic clock. In another embodiment, clock 326 may be synchronized with clocks in communicating transmitters.

At the end of the deployment period, sensor 300 may be retrieved and the recorded data may be downloaded through USB 350. If sensor 300 is equipped with wireless transmitter, the data may be wirelessly downloaded. The data may be then analyzed offline at a data center. In another implementation, the data may be transmitted or directed to a cloud server for further analysis.

Sensor 300 may include various sensors and/or transducer circuitries to enable selection and collection of data. The data may be oceanographic or environmental data. Such sensor may collect, for example, temperature, water salinity, turbidity, velocity, direction, acoustic signature or other indication of wildlife. In one embodiment, additional sensors and circuitry may be included to collect data reflecting seismic imaging. Such data may be used for 3D imaging of rock layers below the sea/ocean floor by means of acoustic signals reflected from the rock layer.

Conventional data center computations typically solve the inverse problem to recreate the geological feature below the sea floor from the recorded reflections. In order to perform such computations, the time each reflection is received by a sensor must be known with high degree of accuracy. For example, an accuracy of less than the period of the highest-frequency acoustic reflection recorded (e.g., several milliseconds) may be needed. Due to this requirement, each sensor may be required to be equipped with a clock of sufficient precision to drift less than this amount over the duration of a deployment period. An exemplary clock capable of such precision is a clock with atomic clock-like accuracy. In an exemplary embodiment, a sensor may be equipped with a clock characteristics similar to that developed by the DARPA's Chip Scale Atomic Clock (CSAC) project to meet the power and size requirements for an untethered sensor. Embodiments using other high precision clock technologies may also be feasible.

Figure 4:
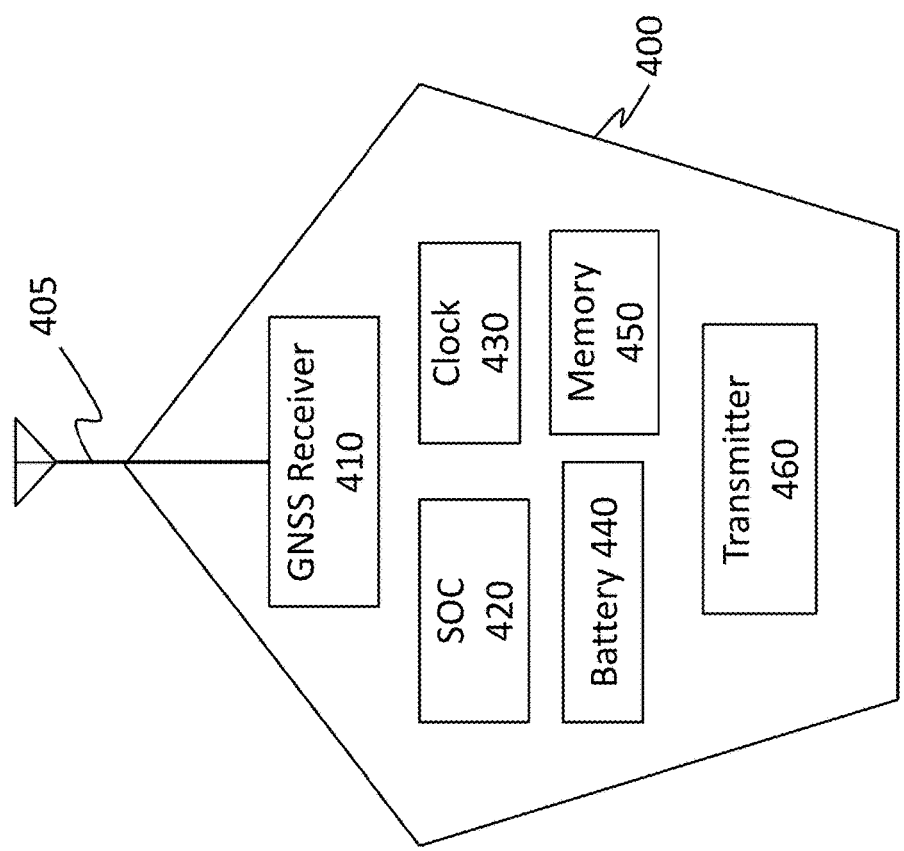
FIG. 4 schematically illustrates the components of an exemplary transmitter device.

FIG. 4 schematically illustrates the components of an exemplary transmitter device. Transmitter 400 of FIG. 4 may define a free-floating or a tethered transmitter such as those shown in FIG. 2. In an exemplary implementation, the transmitter is deployed close to the water surface such that its location is continually known. Conventional means including GNSS chip 410 (or GPS) may be used along with antenna 405 to track location of transmitter 400. Transmitter 400 also includes a clock 430. Transmitter 400 also includes SOC 420, clock 430, battery 440, memory 450 and transmitter 460. As with the sensor clock, transmitter clock 430 may be a CSAC or a similar, high precision, clock. Clock 430 may be used to precisely control and/or record the exact times when a wireless signal is transmitted. Transmitter 460 may include front-end radio components to receive digital data and transmit analog data from antenna 405. battery 440 may include any conventional battery system configured to power transmitter 400 for the desired duration. Memory 450 may define any storage device (e.g., flash memory) for storing instructions for SOC 420. SOC 420 may instruct Transmitter 460 to periodically send signals into the ocean water and record their time of transmission (as determined by Clock 430) in Memory 450; it may also read its position from GNSS Chip 410 and likewise record it in Memory 450. In an exemplary embodiment, antenna 405 and front-end radio may be configured to transmit as well as receive signals.

Figure 5:
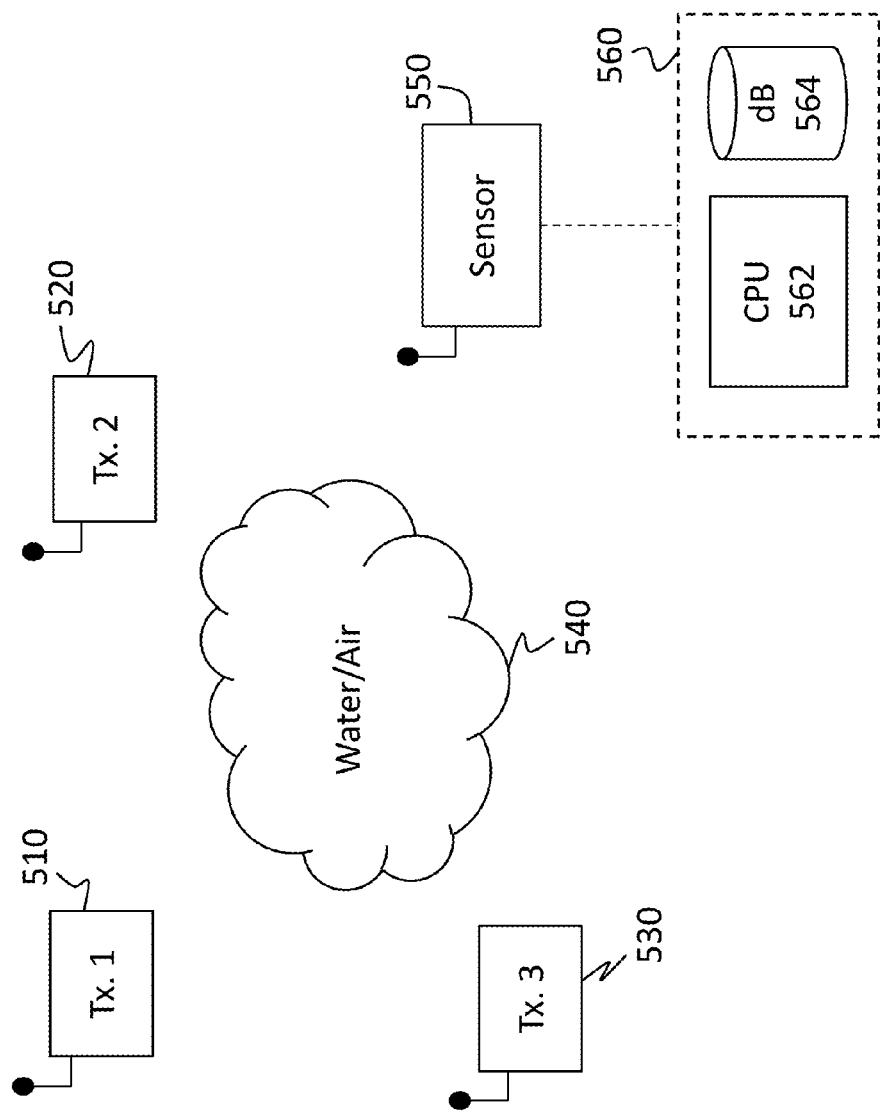
FIG. 5 illustrates a subsurface sensor environment according to one embodiment of the disclosure.

FIG. 5 illustrates a subsurface sensor environment according to one embodiment of the disclosure. The environment of FIG. 5 includes first transmitter 510, second transmitter 520, and third transmitter 530. Transmitters 510, 520 and 530 may comprise conventional transmitters or may comprise transmitters such as those described in relation to FIG. 4. Communication medium 540 is interposed between transmitters 510, 520, 530 and sensor 550. Communication medium 540 may be water, air or a combination of water and air. Transmitters 510, 520 and 530 may communicate through medium 540 with sensor 550 by transmitting signals. The signal may be one of Radio Frequency (RF), acoustic waves, visible or near visible laser light. In one embodiment of the disclosure, transmitters 510, 520 and 530 may transmit signals to intermediate transceiver devices (not shown) which then transmit their own wireless signals (relay signal) to the sensors. The relayed signal may be received and used by the sensor for position determination purposes.

Sensor 550 may comprise a sensor according to the disclosed embodiments. Sensor 550 may be a free-floating, untethered sensor. For example, sensor 550 may comprise a sensor similar to those described in relation to FIG. 3. Sensor 550 may be configured to float at or below the water surface. Sensor 550 may also be configured with self-contained power to enable extended operation and data storage. In one embodiment, the sensor may include acoustic configuration or transponder to ease quick location and recovery.

Sensor 550 may be configured to communicate with an external computer 560. External computer 560 may be any computational device configured to download data from sensor 550. Sensor 550 and external computer 560 may communicate wirelessly or through a wired communication line. External computer 560 may include central processing unit (CPU) 562 comprising one or more processing circuits. External computer 560 may also include one or more memory circuits 564 containing database of instructions for operating CPU 564. Database 564 may contain instructions to cause CPU 562 to perform operations, for example, to receive data collected by a submerged sensor 550. The collected data may comprise a plurality of timestamps indicating receipt of each of a plurality of respective signals which were received at sensor 550. It should be noted that while CPU 562 and database 564 are shown as separate elements, they disclosure is not limited thereto. In certain embodiments, CPU 562 may have the desired instructions embedded therein.

The instructions may also cause CPU 562 to identify transmission time for each of the plurality of signals which were transmitted by a respective transmitter (e.g., transmitters 510, 520 and 530). In one embodiment of the disclosure, each transmitter may be associated with a particular known signal frequency. In one embodiment, sensor 550 may receive various transmitter signals without determining the transmitter identity. External computer 550 may determine the transmission identity after downloading data from sensor 550. In another embodiment, sensor 550 may include one or more processing circuitry and/or memory circuitry to determine the signal transmitter's identity and locally store receipt time along with the transmitter's identity. The instructions stored on database 564 may also cause CPU 562 to determine a distance between the sensor and each of the signal-originating transmitters (e.g., transmitters 510, 520 and 530).

In one embodiment of the disclosure, the instructions contained in database 564 cause CPU 562 to determine relative location of sensor 550 with respect to known location of transmitters 510, 520 and 530 at the time signals were received from each respective transmitters. Such location determination may be implemented as the known location of each transmitter and the calculated distance between the transmitter and the sensor.

In an exemplary implementation, transmission data from each of transmitters 510, 520 and 530 may be stored on each respective transmitter. In another embodiment, each of transmitters 510, 520 and 530 may include a GPS device for self-locating through satellite communication. In still another embodiment, each transmitter may comprise a memory circuitry for storing location as well as time/date of signal transmission. The data may be stored locally on the transmitter for later retrieval. Alternatively, the data may be wirelessly communicated to an external server (e.g., cloud) for further storage and processing.

As stated an embodiment of the disclosure leverages high-precision transmitter and sensor clocks to greatly simplify the Time-of-Flight (TOF). The TOF measurements may be used to determine the sensor's location through triangulation. Rather than using a complex round-trip measurement, which would require both a receiver and a transmitter for the wireless signal at both ends, the sensor may record the arrival time of the each of the wireless signals received from each transmitter, using the time base of its own CSAC (or similar) clock. When the sensor's transducer data are downloaded after retrieval, and at the conclusion of the deployment period, the arrival information is also downloaded. With this information, together with knowledge of the position and the time of transmission of the wireless signal from each of the transmitters, the location of the sensor during the entire deployment period can be computed. Triangulation, trilateration or other similar methods may be used to determine sensor location in relation to the transmitters.

Certain embodiments may supplement the triangulation measurements with other information, such as dead reckoning information from onboard accelerometers and gyroscopes, in the computation of the sensor positioning.

The disclosed embodiments provide several advantages. For example, the disclosed embodiments use existing high-precision clocks in the sensor in order to simplify position determination (i.e., determining ToF from a one-way signal nor from round-trip signal travel). The disclosed embodiments also take advantage of the fact that real-time knowledge of the positions of sensors may not be needed and the triangulation computations may be delayed until the inverse problem computations are performed at an external data center. The disclosed embodiments also avoid the need for potentially power-hungry transmitters in the deployed sensor. That is, sensor 560 may act only as a receiver consuming significantly less power than if it also acted as a transmitter. The disclosed embodiments are readily scalable because a small number of transmitters (510, 520 and 530) can support a large number of sensors (550).

In an exemplary embodiment, the disclosure uses ToF measurement of wireless signals propagated from the transmitter devices and received at the sensor. A key question for implementing this invention is identifying a suitable wireless signal for this purpose. In certain embodiments, the signal comprises low attenuation in seawater such that it can be reliably received by the sensor. The signal may be optionally suitable to use for position location determination. An exemplary signal may be acoustic waves. Acoustic waves may be commonly used as subsurface wireless signals as they propagate through seawater with little attenuation. RF waves may also be used. Seawater possesses both high conductivity and permittivity. Propagation of RF signals in seawater may require Extreme Low Frequency (ELF) waves to avoid prohibitive attenuation.

Carrier Phase Tracking (CPT) may be used to achieve highest precision in measuring ToF of a wireless signal. CPT is used by conventional GPS receivers. CPT allows distances to be measured within about 1% of the wavelength of the wireless signal being used. For a positioning accuracy of about 5 meters, this translates into a maximum wavelength of 500 meters, or a minimum RF frequency of about 10 Hz (RF wavelengths in seawater are far shorter than they are in air). At such a low frequency, even RF waves possess low attenuation. With a propagation velocity of only 1500 meters per second, acoustic waves in the commonly used 10 KHz range meet accurate positioning criteria. As stated, each transmitter may use a slightly different frequency such that a sensor may distinguish transmitters from one another.

If the water is sufficiently clear (e.g., open ocean as opposed to coastal areas) then visible or near-visible laser light (or other light sources) may be used for signal transmission. Other possibilities may include direct electrical signal conduction through salt water, or magnetic induction communications. Because seawater has the same permeability as air, the magnetic field remains largely unaffected. Some embodiments may supplement the triangulation measurements with other information, such as dead reckoning information from onboard accelerometers and gyroscopes, in the computation of the sensor positioning.

Figure 6:
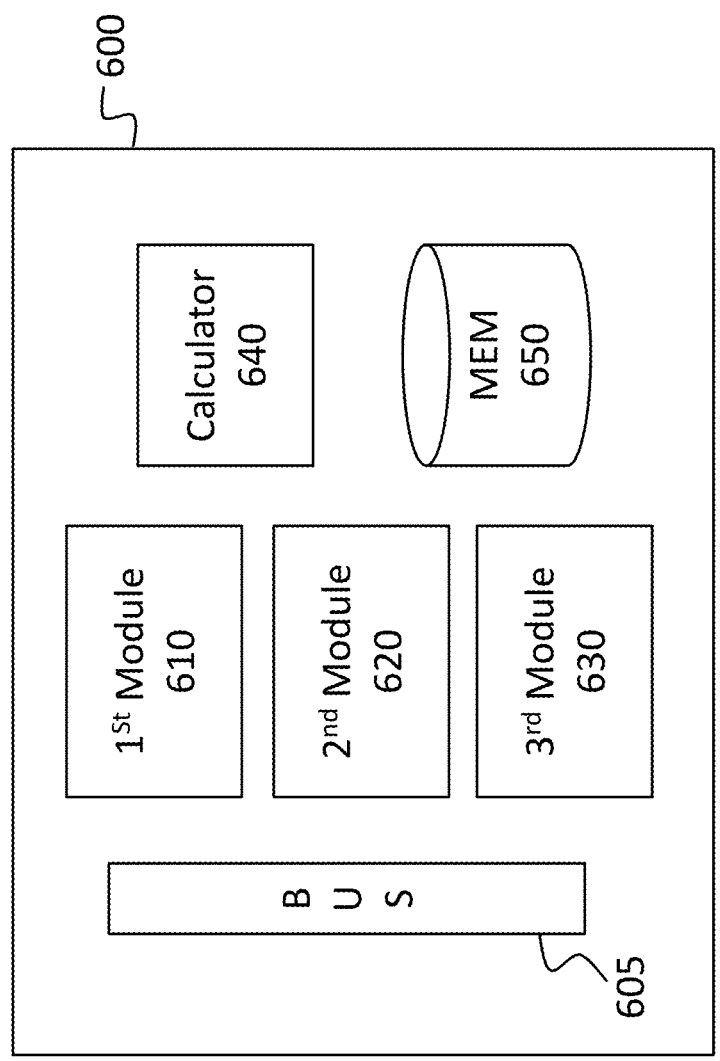
FIG. 6 illustrates an exemplary apparatus configured to collect oceanographic and environmental information.

FIG. 6 illustrates an exemplary apparatus configured to collect oceanographic and environmental information. Apparatus 600 of FIG. 6 may include hardware, software and a combination of hardware and software. Apparatus 600 may be integrated with a free-floating sensor or may be an external device which couples to the sensor through BUS 605. Apparatus 600 includes first module 610, second module 620, third module 630, calculator 640, and memory 650. Each of first module 610, second module 620 and third module 630 may include hardware, software or a combination of hardware and software. First module 610 may be configured to receive a plurality of timestamps collected at a submerged sensor. Each timestamp may indicate receipt of a signal at the submerged sensor. Second module 620 may be configured to calculate a first submerged sensor location as a function of a first signal's timestamp and location of the first signal's origin. Location of the first signal's origin may be retrieved from an external source or from the transmitter transmitting the signal. The signal transmission time and signal receipt time may be governed by a common clock. Location of the transmitter may be independently known and/or verifiable. Third module 630 may be configured to associate oceanographic data collected by the submerged sensor at the calculated submerged sensor locations.

Each of first module 610, second module 620 and 630 may communicate with calculator 640 to calculate distance between the submerged sensor and a respective transmitter as a function of the first signal timestamp. Memory 650 may include one or more memory files for directing each of the modules and calculator 640 to perform necessary operations. Each of modules 610, 620 and 630 may additionally receive sensor information directed to oceanographic and environmental data as discussed above. For example, apparatus 600 may receive water temperature information and correlate the temperature information with sensor (not shown) location and time.

Certain embodiments of the disclosed embodiment may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Figure 7:
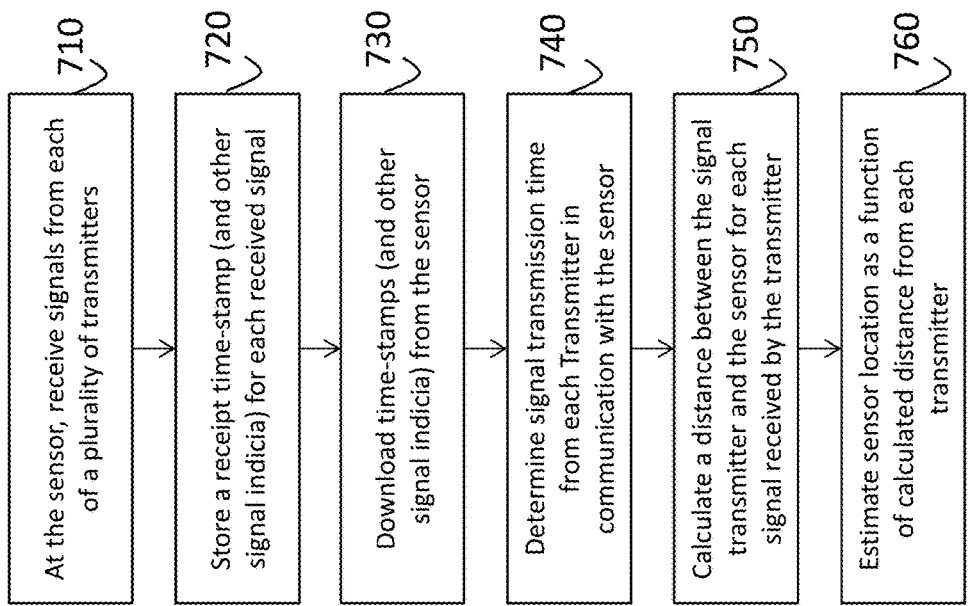
FIG. 7 is a flow-diagram for implementing an exemplary embodiment of the disclosure.

FIG. 7 is a flow-diagram for implementing an exemplary embodiment of the disclosure. The flow-diagram of FIG. 7 starts at step 710 where an untethered sensor receives one or more signals from one or more transmitters. At step 720, the signal receipt time-stamp is stored at a database. The signal receipt time-stamp may be stored along with other information, for example, signal frequency. At step 730, the receipt time-stamp, and optionally other stored information, may be downloaded from the sensor. At step 740, the signal transmission time for each of the received signals is determined. In one embodiment of the disclosure, the signal transmission time is determined by subtracting the signal's receipt time-stamp from the signal's transmission time and multiplying it by speed of sound as is shown in step 750. The sensor's distance from one or more transmitters can be used in connection with known transmitter locations to determine sensor location as shown at step 760.

Example 1 is directed to an apparatus to collect oceanographic information, comprising: a first module configured to receive a plurality of timestamps collected at a submerged sensor, each timestamp indicating receipt of a signal at the submerged sensor; a second module configured to calculate a first submerged sensor location as a function of a first signal's timestamp and location of the first signal's origin; and a third module configured to associate oceanographic data collected by the submerged sensor at the calculated submerged sensor locations.

Example 2 is directed to the apparatus of example 1, wherein the first or the second module is further configured to calculate distance between the submerged sensor and the respective transmitter as a function of the first signal timestamp.

Example 3 is directed to the apparatus of any of the previous examples, wherein the second module is further configured to determine a plurality of temporal sensor locations as a function of the distance to one or more transmitters and known transmitter locations.

Example 4 is directed to the apparatus of any of the previous examples, wherein the submerged sensor is untethered and each respective transmitters is a wireless transmitters.

Example 5 is directed to the apparatus of any of the previous examples, wherein the first signal's origin defines location of a first wireless transmitter.

Example 6 is directed to the apparatus of any of the previous examples, wherein the first signal is one of Radio Frequency (RF), acoustic waves, visible or near visible laser light or Magnetic Induction (MI).

Example 7 is directed to a computer-readable storage device containing a set of instructions to cause a computer to perform a process comprising: receiving data collected by a submerged sensor, the collected data including a plurality of timestamps indicating receipt of each of a plurality of respective signals at the sensor; identifying transmission time for each of the plurality of signals by a respective transmitter; determining a distance between the sensor and a first transmitter; determining a relative sensor location as a function of the first transmitter location and the distance between the sensor and the first transmitter.

Example 8 is directed to the computer-readable storage device of example 7, wherein the collected data further comprises an identification indicia for the signal transmitter.

Example 9 is directed to the computer-readable storage device of any of examples 7-8, wherein the identification indicia includes a unique frequency associated with the signal transmitter.

Example 10 is directed to the computer-readable storage device of any of examples 7-9, further comprising identifying start of transmission time for each of the plurality of signals.

Example 11 is directed to the computer-readable storage device of any of examples 7-10, wherein the sensor is an untethered, free-floating sensor.

Example 12 is directed to the computer-readable storage device of any of examples 7-11, wherein the signal is one of Radio Frequency (RF), acoustic waves, visible or near visible laser light or Magnetic Induction (MI).

Example 13 is directed to the computer-readable storage device of any of examples 7-12, wherein the collected data further comprises oceanographic data collected by the sensor.

Example 14 is directed to a method to determine location of a submerged sensor, the method comprising: at the sensor, receiving signals from a plurality of transmitters; storing a timestamp for each of the received signals; identifying a transmission time for each of the received signals; calculating respective distances between the sensor and each of the plurality of transmitters; determining location of the sensor as a function of the calculated distances and location of each of the plurality of transmitter.

Example 15 is directed to the method of example 14, further comprising storing transmitter indicia associated with each of the plurality of timestamps.

Example 16 is directed to the method of examples 14-15, wherein the transmitter indicia includes a unique frequency for each of the plurality of transmitter.

Example 17 is directed to the method of any of examples 14-16, wherein the sensor is an untethered, free-floating, sensor.

Example 18 is directed to the method of any of examples 14-17, wherein the signal is one of Radio Frequency (RF), acoustic waves, visible or near visible laser light, or Magnetic Induction (MI).

Example 19 is directed to the method of any of examples 14-18, further comprising collecting data reflecting environmental or oceanographic data at the sensor.

Example 20 is directed to the method of any of examples 14-19, wherein environmental data includes temperature, salinity, turbidity, wave velocity, wave direction; acoustic signatures or wildlife indications.

Example 21 is directed to the method of any of examples 14-20, further comprising collecting data reflecting seismic imaging data at the sensor by forming a 3D image from acoustic waves reflected from the submerged surface.

Example 22 is directed to the method of any of examples 14-11, further comprising receiving signals from the plurality of transmitters through one or more intermediate transceiver devices.

While the principles of the disclosure have been illustrated in relation to the exemplary embodiments shown herein, the principles of the disclosure are not limited thereto and include any modification, variation or permutation thereof.

What is claimed is:

1. An apparatus to collect oceanographic information, comprising:
    a first module configured to receive a plurality of timestamps collected at a submerged sensor, each timestamp indicating receipt of a signal at the submerged sensor;
    a second module configured to calculate a first submerged sensor location as a function of a first signal's timestamp and location of the first signal's origin; and
    a third module configured to associate oceanographic data collected by the submerged sensor at the calculated submerged sensor locations.

2. The apparatus of claim 1, wherein the first or the second module is further configured to calculate distance between the submerged sensor and the respective transmitter as a function of the first signal timestamp.

3. The apparatus of claim 1, wherein the second module is further configured to determine a plurality of temporal sensor locations as a function of the distance to one or more transmitters and known transmitter locations.

4. The apparatus of claim 1, wherein the submerged sensor is untethered and each respective transmitters is a wireless transmitters.

5. The apparatus of claim 1, wherein the first signal's origin defines location of a first wireless transmitter.

6. The apparatus of claim 1, wherein the first signal is one of Radio Frequency (RF), acoustic waves, visible or near visible laser light or Magnetic Induction (MI).

7. A non-transitory, computer-readable storage device containing a set of instructions to cause a computer to perform a process comprising:
    receiving data collected by a submerged sensor, the collected data including a plurality of timestamps indicating receipt of each of a plurality of respective signals at the sensor;
    identifying transmission time for each of the plurality of signals by a respective transmitter;
    determining a distance between the sensor and a first transmitter;

determining a relative sensor location as a function of the first transmitter location and the distance between the sensor and the first transmitter; and associating data collected by the submerged sensor at the submerged sensor locations to identify an event at the submerged sensor location.

8. The computer-readable storage device of claim 7, wherein the collected data further comprises an identification indicia for the signal transmitter.

9. The computer-readable storage device of claim 8, wherein the identification indicia includes a unique frequency associated with the signal transmitter.

10. The computer-readable storage device of claim 7, further comprising identifying start of transmission time for each of the plurality of signals.

11. The computer-readable storage device of claim 7, wherein the sensor is an untethered, free-floating sensor.

12. The computer-readable storage device of claim 7, wherein the signal is one of Radio Frequency (RF), acoustic waves, visible or near visible laser light or Magnetic Induction (MI).

13. The computer-readable storage device of claim 7, wherein the collected data further comprises oceanographic data collected by the sensor.

14. A method to determine location of a submerged sensor, the method comprising:
at the sensor, receiving signals from a plurality of transmitters;
storing a timestamp for each of the received signals;
identifying a transmission time for each of the received signals;
calculating respective distances between the sensor and each of the plurality of transmitters;
determining location of the sensor as a function of the calculated distances and location of each of the plurality of transmitter;
associating data collected by the submerged sensor at the submerged sensor locations to identify an event at the submerged sensor location.

15. The method of claim 14, further comprising storing transmitter indicia associated with each of the plurality of timestamps.

16. The method of claim 15, wherein the transmitter indicia includes a unique frequency for each of the plurality of transmitter.

17. The method of claim 14, wherein the sensor is an untethered, free-floating, sensor.

18. The method of claim 14, wherein the signal is one of Radio Frequency (RF), acoustic waves, visible or near visible laser light, or Magnetic Induction (MI).

19. The method of claim 14, further comprising collecting data reflecting environmental or oceanographic data at the sensor.

20. The method of claim 19, wherein environmental data includes temperature, salinity, turbidity, wave velocity, wave direction; acoustic signatures or wildlife indications.

21. The method of claim 14, further comprising collecting data reflecting seismic imaging data at the sensor by forming a 3D image from acoustic waves reflected from the submerged surface.

22. The method of claim 14, further comprising receiving signals from the plurality of transmitters through one or more intermediate transceiver devices.

* * * * *